United States Patent [19]

Udipi et al.

[11] 4,135,037

[45] Jan. 16, 1979

[54] ADHESIVES AND LAMINATES

[75] Inventors: Kishore Udipi; Henry L. Hsieh, both of Bartlesville, Okla.

[73] Assignee: Phillips Petroleum Company, Bartlesville, Okla.

[21] Appl. No.: 806,655

[22] Filed: Jun. 15, 1977

[51] Int. Cl.[2] .............................................. B32B 25/16
[52] U.S. Cl. .................................... 428/414; 156/330; 260/27 BB; 428/416
[58] Field of Search ......................... 260/27 R, 27 BB; 428/414, 416; 156/330

[56] References Cited

U.S. PATENT DOCUMENTS

| | | | |
|---|---|---|---|
| 3,215,586 | 11/1965 | Lister et al. | 428/414 |
| 3,330,794 | 7/1967 | Gallagher | 428/414 X |
| 3,846,163 | 11/1974 | Kest | 260/27 BB X |
| 3,950,291 | 4/1976 | Jurrens | 260/27 BB X |
| 3,993,613 | 11/1976 | Doss et al. | 260/27 BB X |
| 4,021,403 | 5/1977 | Fujiwara et al. | 428/416 X |

Primary Examiner—Lewis T. Jacobs

[57] ABSTRACT

Adhesive compositions comprising epoxidized rubbery copolymers and rosin-based tackifiers which exhibit superior tack and which are useful in laminating structures exhibiting outstanding peel strength and good water-resistance properties.

18 Claims, No Drawings

ADHESIVES AND LAMINATES

This invention relates to adhesive compositions and to structures having surfaces adhesively joined together therewith. In accordance with another aspect, this invention relates to adhesive compositions comprising epoxidized rubbery copolymers and rosin-based tackifiers. In accordance with a further aspect, epoxidized rubbery copolymers of conjugated diene and monovinylarene containing rosin-based tackifiers are provided as adhesives for bonding various structures together. In accordance with still another aspect, this invention relates to a method for uniting surfaces of various elements by application of an adhesive composition consisting of an epoxidized rubbery copolymer and a rosin-based tackifier. In accordance with a further aspect, this invention relates to the bonding together of a plurality of metal surfaces with an adhesive composition of an epoxidized rubbery copolymer and a rosin-based tackifier.

Many adhesive and cementing compositions have been suggested in the art for bonding materials such as rubber, wood, plastic, paper, fabric, and the like, to each other or other materials. Various types of polymers have been suggested for use in adhesive recipes to accomplish these goals, but the majority of the polymers developed by the prior art have not been completely satisfactory, particularly in relation to peel strength, water resistance, and tack.

Accordingly, an object of this invention is to provide adhesive compositions which possess outstanding characteristics of flexibility and strength under widely varying conditions of temperature.

A further object of this invention is to provide adhesive compositions which are characterized by their ability to adhere to a wide variety of substrates.

It is a further object of the invention to provide an adhesive composition having superior tack.

A still further object of the invention is to provide a laminated structure containing epoxidized rubbery copolymers which has outstanding peel strength and exhibits good water resistance.

Another object of the invention is to provide a process for bonding substrates together to form a bond with good strength.

A still further object of the invention is to provide a process for bonding metal substrates together.

Other objects, aspects, and the several advantages of the invention will be apparent to those skilled in the art upon a study of the disclosure and the appended claims.

In accordance with the invention, compositions useful as adhesives are provided, which compositions comprise at least one epoxidized rubbery copolymer of a conjugated diene and a monovinylarene and at least one rosinbased tackifier.

In accordance with one embodiment of the invention, adhesive compositions of epoxidized rubbery copolymers of conjugated dienes and monovinylarenes and rosin-based tackifiers are used for bonding together various substrates to form laminated assemblies.

The rubbery copolymers useful in this invention generally include random, block, linear teleblock, and radial teleblock copolymers, including those containing random and tapered block segments, and mixtures thereof, said polymers having a conjugated diene/monovinylarene weight ratio of 45/55 to 95/5 and having a weight average molecular weight of about 15,000 to 350,000. A preferable range of conjugated diene/monovinylarene weight ratios is from 50/50 to about 90/10. Especially preferred are linear teleblock copolymers which contain from 55/45 to about 85/15 conjugated diene/monovinylarene weight ratios and having a weight average molecular weight of about 50,000 to 150,000.

The useful rubbery copolymers can be prepared as generally described in U.S. Pat. Nos. 2,975,160; 3,265,765; and 3,280,084.

The conjugated dienes used for the preparation of the rubbery copolymers of this invention are those containing from 4 to 12 carbon atoms per molecule, more preferably from 4 to 8 carbon atoms per molecule. Examples of such monomers are 1,3-butadiene, isoprene, 2,3-dimethyl-1,3-butadiene, piperylene, 3-butyl-1,3-octadiene, 2-phenyl-1,3-butadiene, and the like, and mixtures thereof. Especially preferred are 1,3-butadiene and isoprene.

The monovinylarene monomers can contain alkyl, cycloalkyl, and aryl substituents, and combinations thereof, such as alkylaryl in which the total number of carbon atoms in the combined substituents is generally not greater than 12. Examples of aromatic monomers include styrene, $\alpha$-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene, and the like. Styrene is presently preferred because of its availability and effectiveness.

The epoxidized copolymers of this invention can be prepared by the epoxidation procedures as generally described in the *Encyclopedia of Polymer Science and Technology*, Volume 6, page 83 ff., and in U.S. Pat. No. 3,699,184.

The epoxidation is conducted in such a way so as to substantially eliminate the possibility of epoxidizing any monovinylarene portions of the polymer, but under such conditions that the extent of epoxidation, as defined by the ratio of olefinic double bonds modified by the epoxidation reaction to the number of initial double bonds, can vary from 5 to 80 percent, preferably from 15 to 60 percent. Epoxidation can be effected by generally known methods such as by reaction with organic peracids which can be preformed or formed in situ during the reaction. Preformed peracids suitable for use include such as peracetic and perbenzoic acids, while in situ formation is exemplified by the use of hydrogen peroxide in the presence of a low molecular weight fatty acid such as formic acid, or hydrogen peroxide in the presence of acetic acid (or acetic anhydride) and a cationic exchange resin. In the latter case, the cationic exchange resin can be substituted by an alternate strong acid catalyst such as sulfuric acid or p-toluenesulfonic acid. The epoxidation reaction can be conducted directly on the polymerization cement (polymer solution as formed), or alternately the recovered rubber polymer can be redissolved in an inert solvent such as toluene, benzene, hexane, cyclohexane, and the like, and epoxidation conducted on this new solution.

Tackifiers useful in this invention are the modified and unmodified rosins and derivatives thereof. Examples include rosin itself, hydrogenated rosin, dehydrogenated rosin, dimerized and polymerized rosin, and the esters of rosin and the modified rosins with alcohols and polyols such as methanol, ethylene glycol, di- and triethylene glycols, glycerol, or pentaerythritol, and the like. Many such materials are commercially available under a wide variety of trade names. Examples of commercially available tackifiers useful in this invention are "Staybelite" Ester 3 (triethylene glycol ester of hydrogenated rosin), "Staybelite" Ester 10 (glycerol ester of hydrogenated rosin), "Foral" 85 and 105 (highly hydrogenated rosin esters of pentaerythritol), "Pentalyn" H (pentaerythritol ester of hydrogenated rosin), and "Hercolyn" D (methyl ester of hydrogenated rosin purified by steam distillation), all sold by Hercules, Incorporated. "Hercolyn" D in addition also serves as a plasticizer and softener in rubber formulations.

Phenolic based tackifiers are also to be considered suitable for this invention. These include the phenolic resins, alkylphenol-formaldehyde resins, terpene-phenolic resins, and the like. These are sold by Schenectady Chemicals, Inc., as, for example, SP-567 and SP-1068; by Akron Chemical Company as, for example, Akrochem P-90; and by Ashland Chemical Company as, for example, Arofene Resin 8318 and Arofene Resin 9474.

It is within the scope of this invention to include various other components in the adhesive composition. For example, in some instances it can be desirable to add such materials as pigments, wetting agents, antioxidants, curatives, reinforcing agents, plasticizers, and fillers, and the like, to the adhesive recipe.

The epoxidized rubbery copolymer, tackifier, and any other additives to be included in the formulation can be blended by any convenient method known in the art. The order of mixing is not critical. One well-known method is melt blending which comprises stirring of one or more of the materials into a melted batch of the other material using a mixer to assure adequate agitation for complete dispersion of the added components within the melted component. This composition can then be applied to the substrate by a method known in the art as hot melt application.

The tackifier level employed for hot melt applications is generally from 50 to 300 weight percent based on the epoxidized rubbery copolymer, but chosen preferably such that the initial viscosity of the adhesive formulation is between about 1,000 and 100,000 cps or higher, as measured at 400° F. (204° C.) using a Brookfield Viscometer equipped with a thermocell.

If the desired adhesive composition is to be applied to the substrate as a solution, it is desirable to employ an inert organic solvent to sufficiently reduce the viscosity of the adhesive composition to the point where it can be readily applied to the surface of the substrate. The solvent also serves to wet the surfaces of the materials to be bonded together, facilitating adhesive application. Useful solvents include paraffinic, cycloparaffinic, and aromatic compounds such as pentane, hexane, octane, methylcyclopentane, cyclohexane, benzene, toluene, xylene, and mixtures thereof. It is to be understood that other liquid organic solvents, such as halogenated hydrocarbons, ethers, esters, ketones, and the like, can also be employed in the adhesive formulations. Although the amount of solvent is not especially critical, the amount employed to provide a solution is generally in the range of 40–90 weight percent (based on adhesive plus solvent), preferably 60–85 weight percent.

The inventive adhesive composition can also be prepared and applied as a dispersion in which case appropriate emulsifiers, etc., can also be added. If a latex is prepared, the solids content thereof is generally in the range of 5–40 weight percent.

In actual operation, the epoxidized rubbery copolymers and rosin-based tackifiers employed as adhesives in this invention are especially useful as hot melt adhesives which can be employed in conventional manner, e.g., application by an extrusion technique in which the molten polymer is allowed to flow on or between substrates to be bonded, or by application as a preformed film between substrates or other forms which are subject to heating. The copolymers employed as adhesives also can be used as solvent cements, in which the polymers dissolved in a suitable solvent are applied in a conventional manner to substrates with the bond produced as the solvent evaporates or with solvent evaporation followed by a thermal bond-forming operation.

The adhesives of the invention can be used to bond a variety of like or unlike substrates, e.g., metals such as aluminum, iron, steel, e.g., carbon steel, zinc, or tin; wood; paper; leather; plastics; and the like.

EXAMPLE I

Preparation of Isoprene/Styrene Block Copolymers

Polymerizations were carried out employing essentially anhydrous reagents and conditions under an inert atmosphere (nitrogen) in 26-oz. beverage bottles equipped with a perforated Crown cap over a self-sealing rubber gasket. Ingredients were charged and the polymerizations conducted at the conditions stipulated in Recipe 1.

Recipe 1

| Step I | Polymer Identification | | | |
|---|---|---|---|---|
| | A | B | C | D |
| Cyclohexane, parts by weight | 780 | 780 | 780 | 780 |
| Sec-Butyllithium, mehm[a] | 1.6 | 1.93 | 1.33 | 1.7 |
| Styrene, parts by weight | 7.5 | 15 | 7.5 | 15 |
| Polymerization time, minutes[b] | 5,30 | 5,30 | 5,30 | 5,30 |
| Polymerization temperature, °C[b] | 50,70 | 50,70 | 50,70 | 50,70 |
| Step II | | | | |
| Isoprene, parts by weight | 85 | 70 | 85 | 70 |
| Polymerization time, minutes | 45 | 45 | 45 | 45 |
| Polymerization temperature, °C | 70 | 70 | 70 | 70 |
| Step III | | | | |
| Styrene, parts by weight | 7.5 | 15 | 7.5 | 15 |
| Polymerization time, minutes | 30 | 30 | 30 | 30 |
| Polymerization temperature, °C | 70 | 70 | 70 | 70 |

[a]Milliequivalents per 100 grams of total monomers added in all steps of recipe.
[b]5 minutes at 50° C followed by 30 minutes at 70° C.

Following the completion of Step III, 2,4-di-t-butyl-4-methylphenol (one part by weight per hundred parts of total monomers) was added in a 50/50 (by volume) toluene/isopropyl alcohol solution, and the polymer recovered by adding the polymerization mixture to isopropyl alcohol. The coagulated polymer was collected by filtration and dried under reduced pressure. Physical properties of the isoprene/styrene block polymers prepared by this procedure are shown in Table I.

TABLE I

| Physical Properties of Isoprene/Styrene Block Polymers | | | | |
|---|---|---|---|---|
| | Polymer Identification[a] | | | |
| | A | B | C | D |
| Inherent Viscosity | 0.58 | 0.47 | 0.87 | 0.91 |
| Molecular Weight, $M_w$ | 74,000 | 67,000 | 123,000 | 89,000 |
| Molecular Weight, $M_n$ | 59,000 | 53,000 | 105,000 | 77,000 |
| Gel, % by weight | 0 | 0 | 0 | 0 |
| Styrene, % by weight | 16.5 | 32.7 | 15.8 | 32.0 |
| Polymerization Yield, % | 94 | 89 | 94 | 96 |

[a]Compositions as described in Recipe 1.

EXAMPLE II

Epoxidation of Isoprene/Styrene Block Copolymers

Epoxidation was conducted according to Recipe 2.

Recipe 2

| Isoprene/Styrene Block Copolymer, grams | 100 |
|---|---|
| Toluene, grams | 860 |
| Acetic anhydride, ml | 11.6 |
| 30% Hydrogen peroxide, ml | 52 |
| Dowex 50W-X8[a], grams | 23 |
| Reaction time, hours | 3 |
| Reaction temperature, °C | 70 |

[a]Cationic exchange resin.

Acetic anhydride and the cationic exchange resin were added to a stirred solution of the polymer in toluene maintained at 70° C. Hydrogen peroxide was then added dropwise with continued stirring over a period of 10 to 15 minutes. This mixture was then stirred and maintained at 70° C. for three hours. The acid catalyst was then removed by filtration, the epoxidized polymer coagulated in isopropyl alcohol, and purified by recoagulating one or more times in isopropyl alcohol from toluene solution. Prior to the final coagulation, one phr 2,6-di-t-butyl-4-methylphenol was added as a ten weight percent solution in 50/50 (by volume) toluene/isopropyl alcohol. The coagulated polymer was dried under reduced pressure.

Table II lists the epoxidized isoprene/styrene block copolymers prepared using this procedure.

TABLE II

Epoxidized Isoprene/Styrene Block Copolymers

| | Polymer Identification | | | |
|---|---|---|---|---|
| | E | F | G | H |
| Parent Polymer[a] | A | B | C | D |
| Oxirane oxygen, wt. % | 4.57 | 4.37 | 4.56 | 4.08 |
| Total oxygen, wt. % | 8.07 | 7.37 | 7.89 | 8.24 |
| Extent of epoxidation, %[b] | 28.6 | 34.7 | 28.4 | 33.1 |
| Yield of recovered epoxidized polymer | 94 | 100 | 94 | 102 |

[a]Identification given in Recipe 1 and Table I.
[b]Ratio of olefinic double bonds modified by the epoxidation reaction to the number of initial double bonds. This value is calculated from the weight percent oxirane oxygen, the weight percent total oxygen, the known ratio of isoprene/styrene in the polymer, and the molcular weights of isoprene and styrene. For example, for epoxidized polymer E which has an isoprene/styrene ratio of 85/15, there would be one mole of olefinic double bond for every 80 grams of polymer [68 grams (molecular weight of isoprene) ÷ 85% (weight percent isoprene in polymer) = 80 grams]. If 100 percent of the olefinic bonds were converted to oxirane rings, there would be 16 grams of oxygen combined with every 80 grams of polymer. Since analysis indicates only 3.66 grams of oxirane oxygen to be present for every 80 grams of polymer [4.57 wt. percent oxirane oxygen × 80 grams = 3.66 grams], this indicates that only 22.8 percent of the total olefinic bonds have been converted to oxirane rings [3.66 grams oxirane oxygen ÷ 16 grams oxirane oxygen if 100% epoxidized X 100 = 22.8 percent]. The difference between the weight percent total oxygen and the weight percent oxygen [8.07%–4.57% = 3.5% for polymer E] is assumed to be derived from acid hydrolyzed oxirane rings resulting in geminal hydroxy and acyloxy groups. Calculations are made in the same manner as for the oxirane oxygen with the exception that if 100% of the olefinic bonds were converted to the acid hydrolyzed form, 48 grams of oxygen would be combined with every 80 grams of polymer. For polymer E, this calculates to 5.8% of the olefinic bonds converted to geminal hydroxyacyloxy groups [3.5%×80 grams ÷ 48 grams × 100 = 5.8%]. The total olefinic bonds modified by epoxidation is thus 22.8% + 5.8% = 28.6%.

EXAMPLE III

Evaluation of Raw Epoxidized Isoprene/Styrene Block Copolymers as Hot Melt Adhesives Method ASTM D1876-72, "Peel Resistance of Adhesives (T-Peel Test)," was used to evaluate the adhesive bond strength of the epoxidized isoprene/styrene block copolymers prepared according to the procedure described in Examples I and II. Laminates of epoxidized rubber and the analogous unepoxidized rubber controls between identical aluminum sheets were prepared by melting the rubber between the aluminum sheets in a laboratory hydraulic press and allowing the laminate to cool in the press while being maintained under load. These laminated samples were tested at room temperature for T-peel strength as prepared and after immersing for 24 hours in water at 100° C., the latter to test the water resistance of the adhesive bond. The results of this evaluation are shown in Table III.

TABLE III

T-Peel Strength of Epoxidized and Unepoxidized Isoprene/Styrene Copolymers

| | T-Peel Strength[b] | | T-Peel Strength[b] after 24 hours in water at 100° C, | |
|---|---|---|---|---|
| Polymer I.D.[a] | ppiw[c] | (kN/m)[d] | ppiw[c] | (kN/m)[d] |
| A | 3.6 | (0.63) | 1.9 | (0.33) |
| E[e] | 6.3 | (1.10) | 1.6 | (0.28) |
| B | 4.9 | (0.86) | 2.2 | (0.39) |
| F[e] | 9.0 | (1.58) | 2.9 | (0.51) |
| C | 2.9 | (0.51) | 2.4 | (0.42) |
| G[e] | 4.3 | (0.75) | 4.0 | (0.70) |
| D | 3.0 | (0.53) | 2.8 | (0.49) |
| H[e] | 4.3 | (0.75) | 5.1 | (0.89) |

[a]Compositions and structures given in Recipe 1 and Tables I and II.
[b]ASTM D1876-72.
[c]Pounds per inch of width.
[d]Kilonewton per meter of width.
[e]Epoxidized polymer.

These data show the epoxidized polymers E, F, G, and H to have significantly better T-peel strengths than the corresponding unepoxidized parent polymers A, B, C, and D. The water resistance of the higher molecular weight epoxidized polymers G and H are shown to be exceptionally good. In general, the T-peel strength of epoxidized polymers after immersing in 100° C. water for 24 hours is equivalent to or better than that of the unepoxidized parent polymers.

EXAMPLE IV

Evaluation of Epoxidized Butadiene/Styrene Block Copolymer in Hot Melt Pressure-Sensitive Adhesive Formulations A block copolymer of the structure styrene-butadiene/styrene (tapered)-styrene (20-54/6-20) was prepared and epoxidized by conventional polymerization and epoxidation procedures. Properties of this polymer are given in Table IV.

TABLE IV

Properties of Epoxidized and Unepoxidized Butadiene/Styrene Block Copolymer

| | Unepoxidized | Epoxidized |
|---|---|---|
| Inherent Viscosity | 0.71 | 0.58 |
| Molecular Wt., $M_w$ | 52,000 | 73,000 |
| Molecular Wt., $M_n$ | 45,000 | 61,000 |
| Gel, Wt. % | 0 | 3[a] |
| Styrene, Wt. % | 46.0 | — |
| Block Styrene, Wt. % | 37.8 | — |
| Oxirane, Wt. % | — | 3.72 |
| Total Oxygen, Wt. % | — | 6.07 |

[a]Instead of gel, this may be organic sodium salt produced from the sodium hydroxide neutralization of the excess acid left from the epoxidation step.

Hot melt pressure-sensitive adhesive formulations based on the epoxidized butadiene/styrene block copolymer were tested for probe tack according to a modified procedure based on method ASTM D-2979-71, "Pressure-Sensitive Tack of Adhesives Using an Inverted Probe Machine." Inventive composition 1, comprising a rosin acid tackifier, and comparative composition 2, comprising a hydrocarbon tackifier, were formulated according to Recipes 3 and 4. These two compositions were melted on 0.002 inch (0.051 mm) Mylar film and the molten adhesive then spread to 0.001 to 0.003 inch (0.025 to 0.076 mm) film with a 0.0015 inch (0.038 mm) Bird applicator and allowed to cool to room temperature.

Recipe 3

Composition 1

| Component | Parts by Weight |
|---|---|
| Epoxidized Butadiene/Styrene Copolymer | 100 |
| Hercolyn D[a] (tackifier and plasticizer) | 100 |
| Pentalyn H[b] (tackifier) | 100 |
| Irganox 1076[c] (antioxidant) | 3 |

[a] Methyl ester of hydrogenated rosin; Hercules, Incorporated.
[b] Pentaerythritol ester of hydrogenated rosin; Hercules, Incorporated.
[c] n-Octadecyl [3-(3,5-di-t-butyl-4-hydroxyphenyl)] propionate; Ciba-Geigy.

Recipe 4

Composition 2

| Component | Parts by Weight |
|---|---|
| Epoxidized Butadiene/Styrene Copolymer | 100 |
| Wingtack 95[a] (tackifier) | 150 |
| Tufflo 6204[b] (plasticizer and extender oil) | 100 |
| Piccotex 120[c] (tackifier) | 50 |
| Irganox 1076[d] (antioxidant) | 3 |

[a] Polymerized mixed olefins; Goodyear Tire and Rubber Company.
[b] Naphthenic oil; Atlantic Richfield Co.
[c] Vinyl toluene-alpha methylstyrene copolymer; Hercules, Incorporated.
[d] See footnote (c), Recipe 3.

Results of probe tack testing are given in Table V.

TABLE V

Tackification[a] of Hot Melt Pressure-Sensitive Adhesive Formulations Based on Epoxidized Butadiene/Styrene Copolymer

| Run No. | Probe Tack[b], grams |
|---|---|
| 1 (Inventive) | 1508 |
| 2 (Comparative) | 0 |

[a] Measured using Polyken Probe tack tester manufactured by Testing Machines, Inc. Test conditions were: probe speed: 1 cm/sec; dwell time: 1 sec; contact force: 100 g/cm$^2$.
[b] Average of five trials.

These data serve to illustrate the unexpected superiority of the inventive composition based on rosin acid tackifiers over the comparative composition based on hydrocarbon tackifiers.

As a pressure-sensitive adhesive, as shown in Table V, the performance of the epoxidized polymer is dependent on the formulation used. With hydrocarbon-based tackifiers as used in Composition 2, no pressure-sensitive properties were developed. However, with rosin-ester type tackifiers as are present in Composition 1, the epoxidized polymer had good adhesive properties. This was an unexpected observation since thermoplastic elastomers are typically screened for adhesive properties using Composition 2 since past experience has shown this formulation to work well with these types of polymers.

The following analytical procedures are applicable to the data tabulated in the tables of the preceding examples.

Inherent Viscosity

One-tenth gram of polymer was placed in a wire cage made from 80-mesh screen and the cage placed in 100 ml of toluene contained in a wide-mouth, 4-ounce, (120-ml) bottle. After standing at room temperature (approximately 25° C.) for 24 hours, the cage was removed and a sample of the solution filtered through a fritted glass filtering stick of C porosity and pressured directly into the viscometer. The resulting solution was run through a Medalia-type viscometer supported in a 25° C. bath. The viscometer was previously calibrated with toluene. The relative viscosity is the ratio of the polymer solution to that of toluene. The inherent viscosity is calculated by dividing the natural logarithm of the relative viscosity by the weight of the soluble portion of the original sample.

Molecular Weight, $M_w$ and $M_n$

Determined using a gel permeation chromatography method as described by Gerald Kraus and C. J. Stacy, J. Poly. Sci.: Symposium No. 43, 329-343 (1973).

Gel, Percent by Weight

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce (60-ml) bottle. A piece of folded quarter-inch (0.64 cm) hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce (60-ml) bottle. The same procedure was followed for determining the weight of swelled gel as was used for calibration of the cage. The weight of swelled gel was corrected by subtracting the cage calibration.

Styrene, Percent by Weight

Determined by ultraviolet absorption spectroscopy.

Oxirane Oxygen, Percent by Weight

Weight in grams of oxirane oxygen per 100 grams of epoxidized polymer as determined by procedure described in R. R. Jay, Anal. Chem. 36, 667-668 (1964).

Total Oxygen, Percent by Weight

Weight in grams of oxygen per 100 grams of epoxidized polymer as determined by activation analysis.

Block Styrene, Percent by Weight

Determined using oxidative degradation procedure based on I. M. Kolthoff, T. S. Lee, and C. W. Carr, J. Poly.Sci. 1, 429 (1946).

We claim:

1. A plurality of layers having an adhesive composition consisting essentially of (1) at least one epoxidized rubbery copolymer of a conjugated diene and a monovinylarene having a conjugated diene/monovinylarene weight ratio of 45/55 to 95/5 and a weight average molecular weight of about 15,000 to 350,000 and wherein the extent of epoxidation, as defined by the ratio of olefinic double bonds modified by the epoxidation reaction to the number of initial double bonds, ranges from 5 to 80 percent and (2) at least one rosin-based tackifier between adjacent surfaces thereof as a bonding material therefor.

2. An article according to claim 1 wherein the layers are metal.

3. An article according to claim 1 wherein (1) is a block copolymer of isoprene and styrene or block copolymer of butadiene and styrene.

4. An article according to claim 1 wherein (1) is an epoxidized butadiene block copolymer and (2) is a mixture of a methyl ester of hydrogenated rosin and a pentaerythritol ester of hydrogenated rosin, and further wherein said layers are metal.

5. An article according to claim 4 wherein the metal is aluminum.

6. A method for uniting surfaces of elements which comprises:
(a) applying to at least one of said surfaces an adhesive composition consisting essentially of (1) at least one epoxidized rubbery copolymer of a conjugated diene and a monovinylarene having a conjugated diene/monovinylarene weight ratio of 45/55 to 95/5 and a weight average molecular weight of about 15,000 to 350,000 and wherein the extent of epoxidation, as defined by the ratio of olefinic double bonds modified by the epoxidation reaction to the number of initial double bonds, ranges from 5 to 80 percent and (2) at least one rosin-based tackifier,
(b) holding said surfaces contiguous to one another with said composition disposed therebetween, and
(c) allowing said adhesive composition to bond to said surfaces and form a structure having good T-peel strength.

7. A method according to claim 6 wherein said adhesive composition in (a) is applied to said surfaces as a hot melt and is allowed to cool and bond to said surfaces.

8. A method according to claim 6 wherein said elements are metal.

9. A method according to claim 6 wherein (1) is an epoxidized rubbery copolymer of isoprene and styrene or butadiene and styrene.

10. A method according to claim 6 wherein (1) is an epoxidized rubbery copolymer of isoprene and styrene, (2) is a mixture of a methyl ester of hydrogenated rosin and a pentaerythritol ester of hydrogenated rosin, and further wherein said elements are metal.

11. A method according to claim 6 wherein said adhesive composition in (a) is applied in a solvent and the solvent is allowed to evaporate and form a bond between said layers.

12. An adhesive composition consisting essentially of (1) at least one epoxidized rubbery copolymer of a conjugated diene and a monovinylarene having a conjugated diene/monovinylarene weight ratio of 45/55 to 95/5 and a weight average molecular weight of about 15,000 to 350,000 and wherein the extent of epoxidation, as defined by the ratio of olefinic double bonds modified by the epoxidation reaction to the number of initial double bonds, ranges from 5 to 80 percent and (2) at least one rosin-based tackifier.

13. A composition according to claim 12 wherein the amount of (2) present ranges from about 50 to about 300 weight percent based upon (1) and the adhesive has an initial viscosity of about 1,000 to about 100,000 cps as measured at 400° F. (204° C.) (ASTM method D1876-72).

14. A composition according to claim 12 wherein (1) is an epoxidized block copolymer of isoprene and styrene or butadiene and styrene.

15. A composition according to claim 12 which further contains an antioxidant.

16. A composition according to claim 12 wherein (1) is an epoxidized block copolymer of isoprene and styrene or butadiene and styrene, (2) is a mixture of a methyl ester of hydrogenated rosin and a pentaerythritol ester of hydrogenated rosin, and (3) the composition contains as an antioxidant n-octadecyl [3-(3,5-di-t-butyl-4-hydroxyphenyl)] propionate.

17. A composition according to claim 12 wherein (1) is a rubbery copolymer having a conjugated diene/monovinylarene weight ratio of 50/50 to 90/10, a weight average molecular weight of about 50,000 to 150,000, and an extent of epoxidation ranging from 15 to 60 percent.

18. A composition according to claim 17 wherein (1) is an epoxidized block copolymer of isoprene and styrene or butadiene and styrene.

* * * * *